US009009696B2

(12) United States Patent
Vidal et al.

(10) Patent No.: US 9,009,696 B2
(45) Date of Patent: *Apr. 14, 2015

(54) GENERATING ENCODED IDENTIFICATIONS OF SELECTED SUBSETS OF INSTALLED SOFTWARE PACKAGES ON A CLIENT MACHINE

(75) Inventors: Seth Kelby Vidal, Raleigh, NC (US); James Antill, Bristol, CT (US)

(73) Assignee: Red Hat, Inc., Raleigh, NC (US)

( * ) Notice: Subject to any disclaimer, the term of this patent is extended or adjusted under 35 U.S.C. 154(b) by 998 days.

This patent is subject to a terminal disclaimer.

(21) Appl. No.: 12/768,330

(22) Filed: Apr. 27, 2010

(65) Prior Publication Data

US 2011/0265073 A1 Oct. 27, 2011

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
CPC ................................................ G06F 8/60–8/71
See application file for complete search history.

(56) References Cited

U.S. PATENT DOCUMENTS

| | | | |
|---|---|---|---|
| 5,619,716 A * | 4/1997 | Nonaka et al. | 717/167 |
| 6,374,266 B1 | 4/2002 | Shnelvar | |
| 6,381,742 B2 | 4/2002 | Forbes et al. | |
| 6,789,255 B1 * | 9/2004 | Pedrizetti et al. | 717/169 |
| 7,089,552 B2 | 8/2006 | Atallah | |
| 7,222,341 B2 | 5/2007 | Forbes et al. | |
| 7,305,669 B2 | 12/2007 | Roush | |
| 7,478,383 B2 * | 1/2009 | Shahindoust et al. | 717/172 |
| 7,512,939 B2 | 3/2009 | Brookner | |
| 7,730,325 B2 | 6/2010 | Morrow et al. | |
| 7,761,425 B1 * | 7/2010 | Erickson et al. | 707/649 |
| 7,873,956 B2 | 1/2011 | Kim et al. | |
| 8,161,053 B1 | 4/2012 | Khan et al. | |
| 8,271,969 B2 * | 9/2012 | Quin et al. | 717/170 |
| 8,413,130 B2 * | 4/2013 | Madduri | 717/168 |
| 8,495,621 B2 | 7/2013 | Traut et al. | |

(Continued)

OTHER PUBLICATIONS

Seth Kelby Vidal, "Systems and Methods for Tracking a History of Changes Associated with Software Packages and Configuration Management in a Computing System", U.S. Appl. No. 12/551,523, filed Aug. 31, 2009.

(Continued)

*Primary Examiner* — Tuan Q. Dam
*Assistant Examiner* — Zheng Wei
(74) *Attorney, Agent, or Firm* — Lowenstein Sandler LLP

(57) ABSTRACT

Embodiments relate to systems and methods for generating encoded identifications of selected subsets of installed software packages on a client machine. A physical or virtual client machine can host a set of installed software packages, including operating system, application, and/or other software. A package manager tracks the set of installed packages and updates available for the installed set. The package manager can be configured to capture an inventory of the installed packages, and generate an encoded identification of one or more selected subsets of the set of hosted or installed packages based on size, timestamp, and/or other attributes of the subsets and/or constituent files. An administrator or other user can for instance select only that subset or subsets related to a certain project, application, user group, or other selection criteria, and generate encoded identifications of those subsets for package updating, network management, and/or other purposes.

16 Claims, 5 Drawing Sheets

(56) References Cited

U.S. PATENT DOCUMENTS

| | | |
|---|---|---|
| 8,640,119 B2 | 1/2014 | Vidal et al. |
| 2001/0029605 A1 | 10/2001 | Forbes et al. |
| 2002/0083343 A1 | 6/2002 | Crosbie et al. |
| 2002/0144248 A1 | 10/2002 | Forbes et al. |
| 2002/0170052 A1* | 11/2002 | Radatti ............... 717/171 |
| 2003/0159070 A1 | 8/2003 | Mayer et al. |
| 2004/0015938 A1* | 1/2004 | Taylor ............... 717/168 |
| 2004/0044996 A1 | 3/2004 | Atallah |
| 2005/0005155 A1 | 1/2005 | Morrow et al. |
| 2005/0071839 A1* | 3/2005 | Kim et al. ............... 717/170 |
| 2005/0097543 A1* | 5/2005 | Hirayama ............... 717/168 |
| 2005/0102662 A1* | 5/2005 | Samsalovic et al. ........ 717/168 |
| 2005/0131961 A1 | 6/2005 | Margolus et al. |
| 2005/0165852 A1 | 7/2005 | Albornoz et al. |
| 2005/0210458 A1* | 9/2005 | Moriyama et al. ........ 717/168 |
| 2006/0031827 A1 | 2/2006 | Barfield et al. |
| 2006/0059480 A1* | 3/2006 | Kimoto ............... 717/172 |
| 2007/0233854 A1* | 10/2007 | Bukovec et al. ............ 709/224 |
| 2008/0109799 A1* | 5/2008 | Imamura ............... 717/168 |
| 2008/0134165 A1 | 6/2008 | Anderson et al. |
| 2008/0270493 A1* | 10/2008 | Schwaab et al. ............ 707/205 |
| 2008/0301640 A1* | 12/2008 | Keum et al. ............... 717/120 |
| 2009/0113412 A1* | 4/2009 | Shribman et al. ............ 717/170 |
| 2009/0138870 A1* | 5/2009 | Shahindoust et al. ....... 717/172 |
| 2009/0150974 A1 | 6/2009 | Cho et al. |
| 2009/0235244 A1* | 9/2009 | Enomori et al. ............ 717/170 |
| 2009/0271781 A1* | 10/2009 | Cui et al. ............... 717/173 |
| 2010/0011348 A1* | 1/2010 | Honma et al. ............ 717/168 |
| 2010/0050166 A1* | 2/2010 | Chiu et al. ............... 717/168 |
| 2010/0281475 A1* | 11/2010 | Jain et al. ............... 717/172 |
| 2010/0287547 A1* | 11/2010 | Korkishko et al. ............ 717/177 |
| 2010/0318986 A1* | 12/2010 | Burke et al. ............... 717/176 |
| 2011/0023023 A1* | 1/2011 | Chatterjee ............... 717/170 |
| 2011/0099545 A1* | 4/2011 | Lee et al. ............... 717/172 |
| 2011/0131564 A1 | 6/2011 | Vidal et al. |
| 2011/0131565 A1 | 6/2011 | Vidal et al. |
| 2011/0131566 A1 | 6/2011 | Vidal et al. |
| 2011/0214114 A1 | 9/2011 | Vidal et al. |
| 2012/0011102 A1 | 1/2012 | Borden et al. |

OTHER PUBLICATIONS

Seth Kelby Vidal, "Systems and Methods for Improved Identification and Analysis of Threats to a Computing System", U.S. Appl. No. 12/610,564, filed Nov. 2, 2009.

Seth Kelby Vidal, "Systems and Methods for Utilizing a History of Changes Associated with Software Packages and Configuration Management to Manage Multiple Computing Systems'", U.S. Appl. No. 12/610,610, filed Nov. 2, 2009.

Seth Kelby Vidal, "Systems and Methods for Generating a Version Identifier for a Computing System Based on Software Packages installed on the Computing System", U.S. Appl. No. 12/627,744, filed Nov. 30, 2009.

Seth Kelby Vidal, "Systems and Methods for Managing a Network of Computer System Using a Version Identifier Generated Based on Software Packages Installed on the Computing Systems", U.S. Appl. No. 12/627,989, filed Nov. 30, 2009.

Seth Keiby Vidal, "Systems and Methods for Generating Machine State Verification Using Number of Installed Package Objects", U.S. Appl. No. 12/787,164, filed May 25, 2010.

Seth Kelby Vidal, "Systems and Methods for Tracking a History of Changes Associated with Software Packages in a Computing System", U.S. Appl. No, 12/551,475, filed Aug. 31, 2009.

Seth Kelby Vidal, "Systems and Methods for Determining Compatibility of a Software Package Update Using a Version Identifier", U.S. Appl. No. 12/713,271, filed Feb. 26, 2010.

Seth Kelby Vidal, "Systems and Methods for Detecting Computing Processes Requiring Reinitialization After a Software Package Update", U.S. Appl. No. 12/714,178, filed Feb. 26, 2010.

USPTO; Office Action for U.S. Appl. No. 12/627,989, mailed Apr. 19, 2012.

USPTO; Office Action for U.S. Appl. No. 12/627,989, mailed Sep. 18, 2012.

USPTO; Office Action for U.S. Appl. No. 12/713,271, mailed Nov. 19, 2012.

USPTO; Office Action for U.S. Appl. No. 12/713,271, mailed May 29, 2013.

USPTO; Notice of Allowance for U.S. Appl. No. 12/713,271, mailed Sep. 20, 2013.

USPTO; Notice of Allowance for U.S. Appl. No. 12/627,989, mailed Aug. 15, 2014.

* cited by examiner

GENERATING ENCODED IDENTIFICATIONS OF SELECTED SUBSETS OF INSTALLED SOFTWARE PACKAGES ON A CLIENT MACHINE

FIELD

The present teachings relate to systems and methods for generating encoded identifications of selected subsets of installed software packages on a client machine, and more particularly to platforms and techniques for generating an encoded identification of selectable subsets of software packages installed on one or more physical or virtual machines in a managed network, and/or the attributes of those package subsets.

BACKGROUND OF RELATED ART

Users of physical or virtual machines commonly install software packages, including package updates, to physical or virtual machines. The software packages can contain a set of related files chosen to perform a given application or task, such as, for example, a group of software applications, drivers, and/or other resources used to install and use messaging applications. In instances, a software package can contain application software, operating system software, drivers, patches, and/or other software components grouped as a logical set.

Software package update managers exist to help a user initiate and perform software package updates, such as, for example, the "yum" (Yellowdog update manager) package update manager available from Red Hat Inc., and others. In general, available software package managers are configured to interact with the set of installed packages on a client and with one or more software package repositories, to directly connect to those databases and download available package updates.

The task of managing a network of physical and/or virtual machines can be complicated by the need to identify and track the population of those machines under management, and the software package complements installed on those machines. The machines under management and this package complements may need to be identified and tracked for a variety of purposes, including, for instance, to identify and schedule package updates, activate and deactivate machines assigned to cloud or other networks, perform maintenance, and/or other package or network management tasks. In various networks, for example including those having multiple network administrators, the task of maintaining an inventory of machines, software packages on those machines, and/or other resources may be difficult to coordinate. In cases, network administrators or other users may wish to discover or inventory machines hosting specified individual packages and/or groups of packages that may be installed on network machines, without necessarily retrieving a full profile of all software packages on a given machine. For example, an administrator may wish to identify and update all machines in a managed network having an installed package or set of packages containing software for a certain engineering or software development product or project, without having to identify or analyze all machines present on the network. It may be desirable to provide systems and methods for generating encoded identifications of selected subsets of installed software packages on a client machine, in which machines under management and their hosted packages, selected subsets of those packages, and/or other resources can be discovered, identified, stored, updated and tracked using captured package profiles, facilitating maintenance, updating, and other operations on those deployments, including selectable subsets or groups of package installations.

DESCRIPTION OF DRAWINGS

The accompanying drawings, which are incorporated in and constitute a part of this specification, illustrate embodiments of the present teachings and together with the description, serve to explain the principles of the present teachings. In the figures.

DESCRIPTION OF EMBODIMENTS

Figure 1:
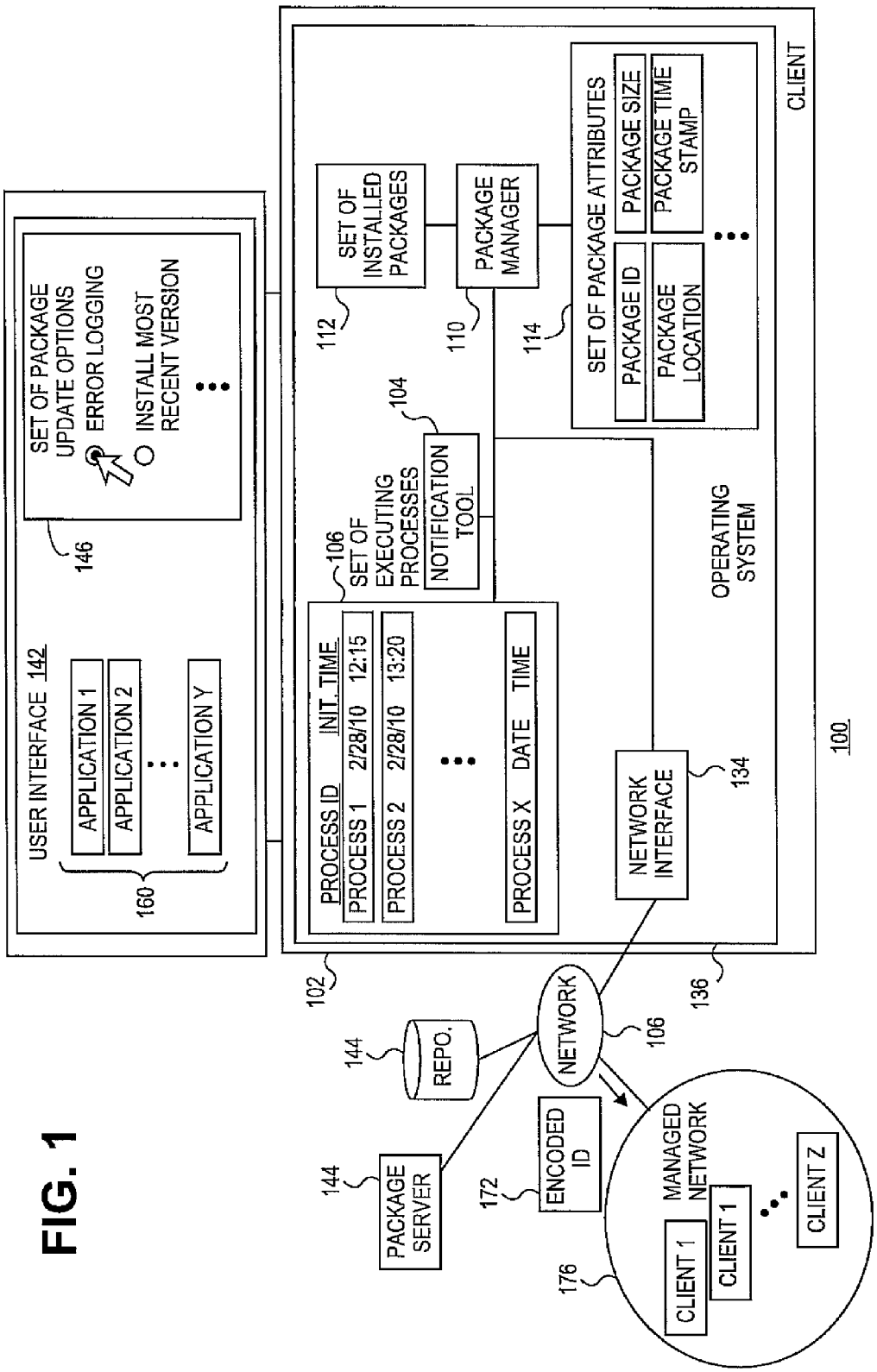
FIG. 1 illustrates an overall network in which systems and methods for generating encoded identifications of selected subsets of installed software packages on a client machine can be implemented, according to various embodiments.

Embodiments of the present teachings relate to for generating encoded identifications of selected subsets of installed software packages on a client machine. More particularly, embodiments related to platforms and techniques for extracting a profile of installed packages, selectable subsets of those packages, and/or other resources hosted on a set of known or unknown machines, and developing and storing an encoded identification of those machines for network management and/or package management purposes. In aspects, a package manager can track and manage the installation of one or more software packages and/or updates to those packages (which may be referred to together as a "software package update") on a client, host, target, physical, virtual, and/or other machine. The package manager can be configured to access the set of installed packages and/or selectable subsets of those packages, and their related attributes on the client or other machine, and derive or generate an encoded identification based on that characterizing data. In aspects, the encoded identification can be or include the results of a hash function applied to package names, versions, timestamps or dates, size, number, and/or other attributes or metadata. In aspects, the encoded identification can be or include similar representations or encodings based on one or more selected subsets of the packages installed on a client or other machine, based on user selection, automatic selections, and/or other selection criteria. In yet further aspects, the encoded identification can be or include the same types of representations or encodings based on the attributes of files contained within packages, or selected subsets of those files.

According to aspects in further regards, the package manager and/or other logic can transmit or share the encoded identification to one or more than one remote management platforms, to permit management operations on that set of machines. For instance, the encoded identification of one or more machines can be transmitted to or accessed by a remote package server and/or software package repository, to permit software package updates to be performed on those machines. In aspects, the encoded identification can in addition or instead be transmitted to or accessed by a network management platform to identify the subject machine(s) for network maintenance, security, and/or other management operations. In aspects, newly connected machines in a managed network can be automatically discovered or identified, and be assigned an encoded representation based on their package profile and/or selected package subsets which can be reported to a network management or other platform to be registered and tracked based on that identification or signature. These and other embodiments described herein address the various noted shortcomings in known package management and network management technology, and provide a user with enhanced package and system management capability including automatic and/or selective identification of deployed machines and their package assets, including an ability to characterize and identify machines based on selectable package groupings.

Reference will now be made in detail to exemplary embodiments of the present teachings, which are illustrated in the accompanying drawings. Where possible the same reference numbers will be used throughout the drawings to refer to the same or like parts.

FIG. 1 illustrates an exemplary system 100 in which systems and methods for generating encoded identifications of selected subsets of installed software packages on a client machine can be implemented, according to various embodiments. In embodiments as shown, a client 102 can store, execute, and otherwise host a variety of resources including a package manager 110 configured to communicate with a set of installed packages 112, and other hardware, software, and resources. In embodiments, package manager 110 can be or include a software application, a utility, an application programming interface (API) to an operating system 136 of client 102, a service, and/or other local or remote logic or resources. According to embodiments, package manager 110 can access and manage set of installed packages 112 to identify, run, edit, update, configure, and otherwise manage one or more software packages hosted or installed in client 102. In aspects, package manager 110 can be or include one or more commercially and/or publicly available package manager applications or resources, such as the "yum" package update manager available from Red Hat Inc. based on or compatible with the Red Hat package manager (rpm) platform, or others.

In aspects, set of installed software packages 112 can be or include packages comprising various types of applications, such as, for example, messaging applications, spreadsheet or modeling applications, social networking applications, word processing applications, and/or other applications, software, or utilities, and can in aspects include an operating system, drivers, and/or components thereof. Set of installed packages 112 can have an associated set of package attributes 114 which records file names, versions, dates, software requirements, an/or other attributes or metadata related to the software package updates installed on client 102. In aspects, package manager 110 and/or other logic can generate, host, and/or interact with a selector 182 to identify and select one or more selected package subset 180 of set of installed packages 112. In aspects, a user may browse set of installed packages 112 in list or other form via selector 182, to check or otherwise select one or more packages to form one or more selected package subset 180 they wish to analyze, manage, and/or identify on client 102. In aspects, one or more selected package subset 180 can in addition or instead be selected or flagged by an automatic identification process, such as, for example, package manager 110 automatically selecting those packages which have been updated in the last 30 days, or using other criteria.

In aspects, and as also shown, package manager 110 can communicate with a network interface 134 configured to connect to one or more network 106, such as the public Internet or other public or private networks. Package manager 110 can thereby connect to one or more package server 170 and/or associated package repository 144 hosting software packages including software package updates, and/or other software or resources. Package server 170 can include logic to identify, organize, and distribute one or more software packages to requesting client, server, virtual, and/or other machines.

In aspects, package manager 110 can interact with set of installed packages 112, package server 170, and/or one or more package repository 144 via network interface 134 and one or more networks 106 to identify and manage the content of set of installed packages 112 operating on client 102, and generate an encoded identification 172 of the client 102 and/or other resources associated with client 102. In aspects, package manager 110 can, for example, provide a user with a set of package update options 146 displayed via user interface 142, such as a graphical user interface or others, to select various test, configuration, and/or other management activities on set of installed packages 112. Set of package update options 146 can include options such as one or more selections to perform to select packages for installation and/or update, installation options, and/or other options or parameters for the downloading of package updates from one or more package repositories to set of installed packages 112.

In aspects, package manager 110 can access and extract information related to set of installed packages 112 to generate an encoded identification 172 of client 102, set of installed packages 112, one or more selected package subset 180, and/or other resources or entities. In aspects, package manager 110 may generate encoded identification 172 based on set of installed packages 112 to create an identifier which can be used by local or remote platforms to perform package update, network management, and/or other operations on client 102. In aspects, the encoded identification 172 can represent a string, label, value, address, and/or other identifier which identifies or associates client 102 by or with its hosted set of installed packages 112 and/or one or more selected package subset 180. For instance, encoded identification 172 can represent the output of a hash function or hash operation performed on one or more attributes of a package contained in set of package attributes 114. For instance, package manager 110 can perform a hash function, such as Secure Hash Algorithm 1 (SHA1) or other hash function versions and/or other encoding algorithms, on attributes such as the package name, package epoch, package timestamp, package size, and/or other data. In aspects in certain regards, the encoded identification 172 can thereby represent a signature or characterizing code associated with a client 102 and its particular software package complement, or selected subset of that complement. In aspects, encoded identification 172 can represent a unique identifier for the particular client 102 whose set of installed packages 112, and/or one or more package subset 180, has been profiled in managed network 176. In aspects, encoded identification 172, including in cases where a hash function or operator is employed, can represent a non-unique identifier in managed network 176, for instance due to hash collision, or can in aspects represent a unique representation of a client 102 and/or its set of installed packages 112, and/or one or more package subset 180.

Figure 2:
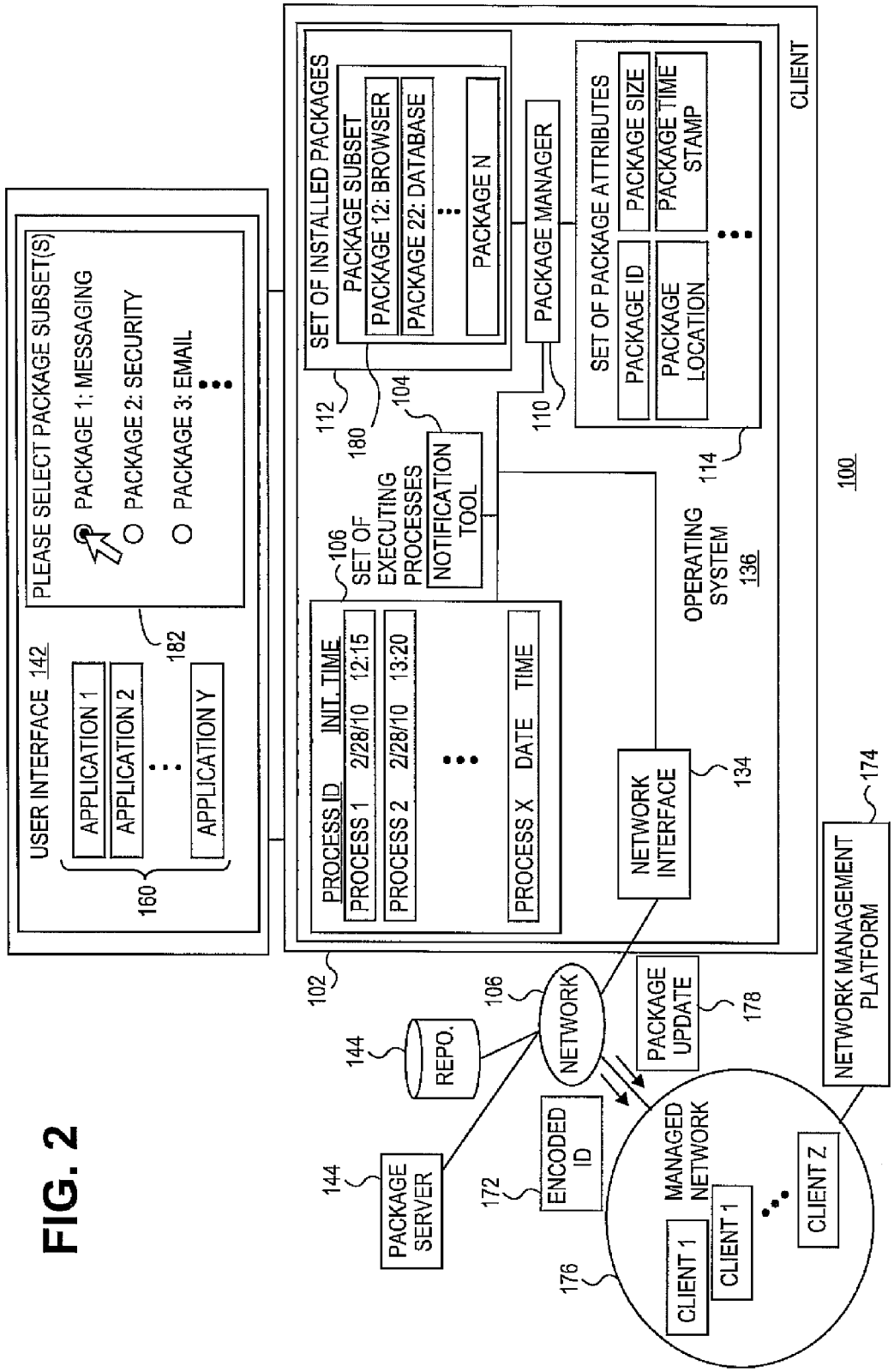
FIG. 2 illustrates an overall network in which for systems and methods for generating encoded identifications of selected subsets of installed software packages on a client machine can be implemented, according to various embodiments in further regards.

As illustrated for example more particularly in FIG. 2, package manager 110 can connect to one or more remote platforms and communicate encoded identification 172 to those platform(s), to perform remote package, network management, and/or other operations or services on client 102. For instance, package manager 110 and/or other logic can access package server 170 and/or one or more repository 144 to initiate package update operations on client 102. For instance, encoded representation 172 can be decoded by package server 170 using package repository 144 via one or more network 106. Package manager 110 can receive one or more software package update 178 via package server 170 and/or one or more repository 144.

According to aspects, package manager 110 and/or other logic can interact with other types of remote platforms using encoded representation, such as, as illustrated a network management platform 174. Network management platform 174 can be or include any type of known or available management server, service, and/or other platform, including, for instance, the Fedora unified network controller ("func") platform available from Red Hat, Inc., Raleigh, N.C., and described in co-pending U.S. patent application Ser. No. 12/130,424 filed May 30, 2008, entitled "Systems and Methods for Remote Management of Networked Systems Using Secure Modular Platform", assigned or under obligation of assignment to the same entity as this application, and which application is incorporated herein by reference. Other types or versions of network management platform 174 cane be used. According to aspects, network management platform 174 can receive and store encoded identification 172 of one or more than one client 102 registered to or associated with managed network 176, and identify and communicate with corresponding client 102 using that identifier. In aspects, for instance, an operator of network management platform 174 can interrogate managed network 176 to discover or locate machines of interest, using encoded identification based on respective set of installed packages 112 and/or set of package attributes 114. For instance, an operator of network management platform 174, and/or package server 170 and/or other platform or logic, can interrogate managed network 176 to transmit a command to identify any client 102 eligible for or compatible with "revision 4" of "software package XYZ." Any client 102 matching the request can be identified using encoded identifier 172 and/or other data associated with corresponding clients or other machines. A query can likewise for instance be transmitted from network management platform 174 to managed network 176 to discover or locate any client 102 hosting "software package A," and/or possessing other attributes, resources, keys, or data, using encoded identifier 172. In aspects, network management platform 174 can group or associate one or more clients 102 having common package signatures in their respective encoded identifier 172, and/or based on other data or attributes.

In aspects, it may be noted that package manager 110 and/or other logic on a given client 102 can generate an updated encoded identifier 172, based on triggering events and/or other criteria. For instance, package manager 110 and/or other logic can generate an updated, revised, or new encoded identifier 172 when set of installed packages 112 in client 102 changes, such as when a package update and/or other software revision is received, and/or other resources associated with client 102 are changed. In aspects, package manager 110 and/or other logic can generate an updated encoded identifier 172 based on other criteria, such as at predetermined intervals or other schedules. Other criteria or conditions can be used to initiate an update to encoded identifier 172 of one or more client 102 in managed network 176. After generating any update to encoded identifier 172, package manager 110 and/or other logic can transmit encoded identifier 172 to one or more remote platform, such as, for instance, package server 170, one or more repository 144, network management platform 174, and/or other platforms, servers, machines, sites, and/or services.

Figure 3:
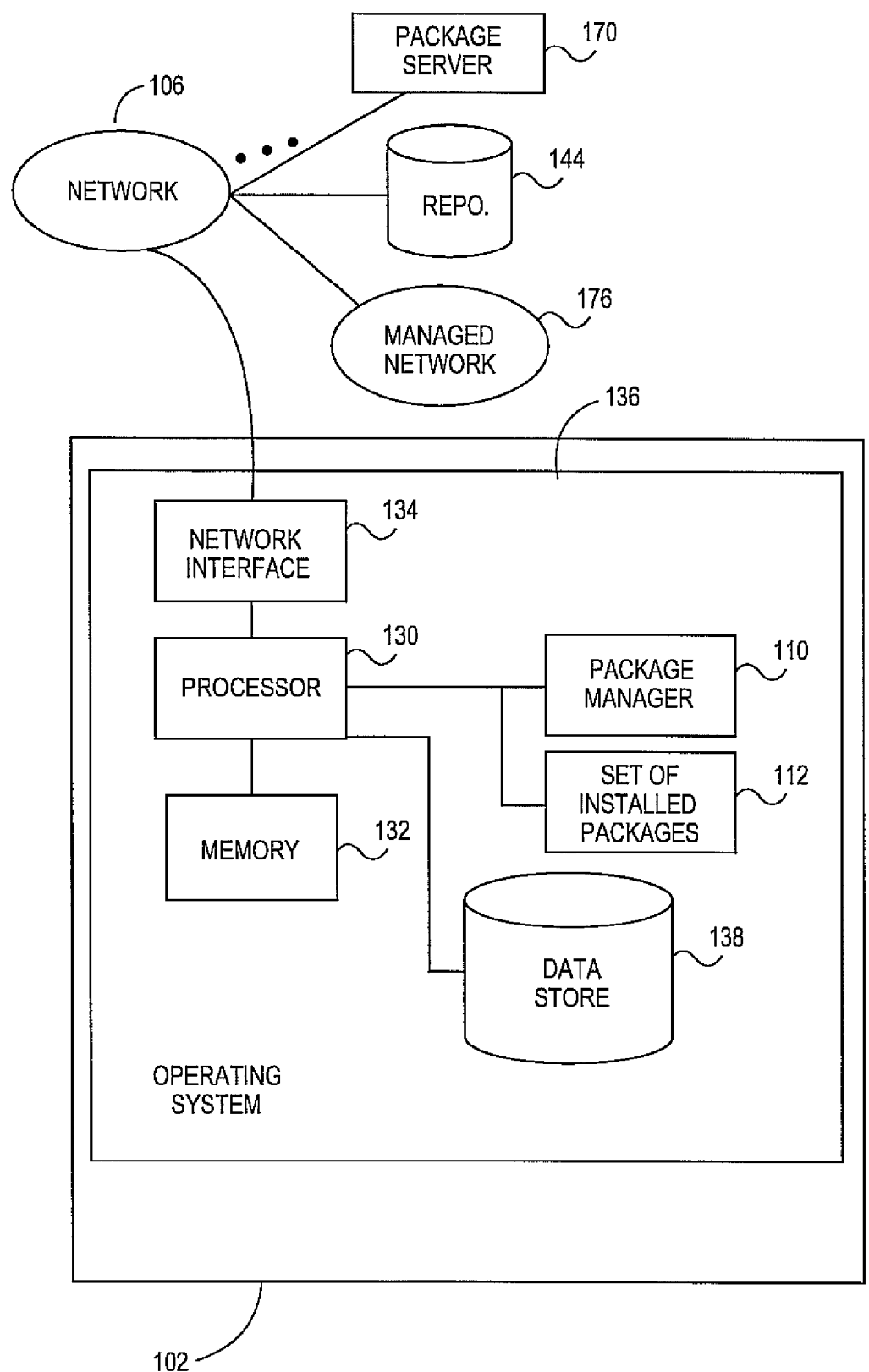
FIG. 3 illustrates exemplary hardware and other resources of a machine that can be used in conjunction with systems and methods for generating encoded identifications of selected subsets of installed software packages on a client machine, according to various embodiments.

FIG. 3 illustrates an exemplary diagram of hardware and other resources that can be incorporated in a client 102 configured to install, host, manage, analyze, test and configure a set of installed packages 112, one or more package subsets 180, and other resources, according to embodiments. In embodiments as shown, client 102 can comprise a processor 130 communicating with memory 132, such as electronic random access memory, operating under control of or in conjunction with operating system 136. Operating system 136 can be, for example, a distribution of the Linux™ operating system, the Unix™ operating system, or other open-source or proprietary operating system or platform. Processor 130 also communicates with data store 138, such as a database stored on a local hard drive. Processor 130 further can communicate with a network interface 134, such as an Ethernet or wireless data connection, which in turn communicates with one or more networks 106, such as the Internet or other public or private networks. Processor 130 also communicates with notification tool 104, package manager 110, and/or other resources to execute control logic and control the updating, installation, analysis and management of software packages and their associated processes. Other configurations of client 102, including processor and memory resources, associated network connections, and other hardware and software resources are possible.

Figure 4:
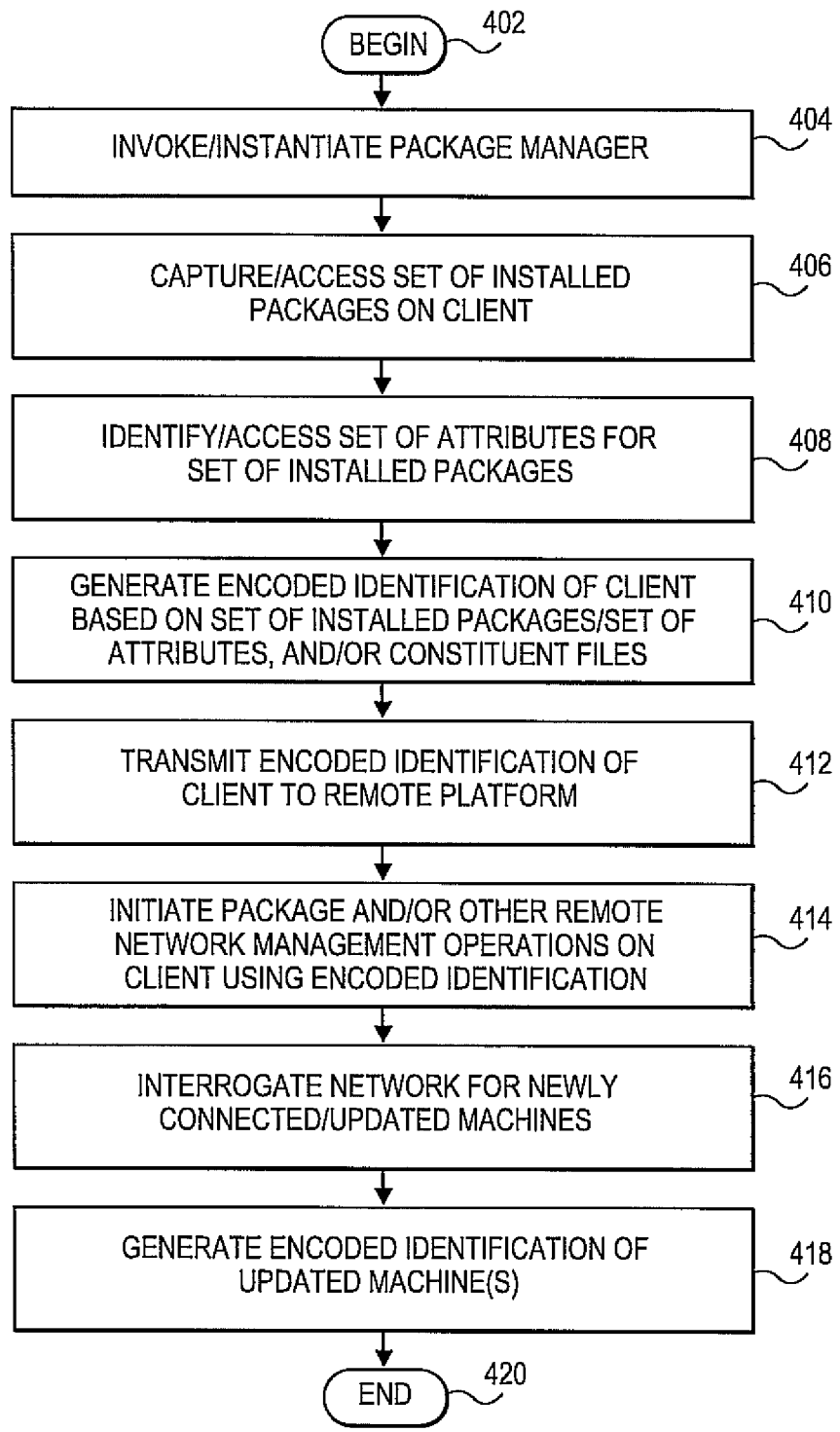
FIG. 4 illustrates a flowchart of processing that can be used in systems and methods for generating encoded identifications of subsets of installed software packages on a client machine, according to various embodiments.

FIG. 4 illustrates overall processing to capture software package information from machines and generate encoded identifications based in aspects generally on entire package complements hosted on those machines, according to various embodiments. In 402, processing can begin. In 404, a user can invoke or instantiate package manager 110 on client 102 to perform software package discovery, machine identification, and other management activity. In 406, package manager 110 and/or other logic can capture and/or access the set of package attributes 114 for set of installed packages 112 installed on client 102. In aspects, set of attributes 114 can be or include the name of an associated package, the version number or other version identifier for that package, a size of that package, an epoch of that package, a location of the package, as well as similar attributes of files contained in the packages, and/or other information. In 410, package manager 410 and/or other logic can generate an encoded identification 172 based on set of attributes 114 for one or more packages and/or constituent files of those packages. In aspects, encoded identification 172 can be generated using a hash function operating on text, strings, or other data reflecting one or more attributes in set of attributes 114. In cases where a hash function or hash operator is used, the hash function can be or include SHA1 (Secure Hash Algorithm 1), SHA2 (Secure Hash Algorithm 2), SHA3 (Secure Hash Algorithm 3), and/or other hash functions, operators or routines. In aspects, encoded identification 172 need not be based on a hash function, but can in addition or instead be based on other classes of functions or algorithms.

In 412, package manager 110 and/or other logic can transmit encoded identification 172 to a remote platform, such as a package server 170, a network management platform 174, and/or other remote server, platform, or service. In 414, package operations and/or other remote network management operations or functions can be initiated on client 102 using encoded identification 172. For instance, in aspects, package server 170 can identify client 102 using encoded identification 172 and generate a package update to update set of installed packages 112 on client 102. For further instance, in aspects, a network management platform 174 can establish a secure channel, or otherwise communicate, with client 102 to perform network management functions, such as, for example, performing configuration management on one or more client 102, executing security services related to one or more client 102, and/or other management operations. In 416, a managed network 176 containing one or more client 102 can be interrogated, for instance via network management platform 174, to discover any newly connected, activated, and/or updated machines. For instance, network management platform 174 can be configured to discover physical and/or virtual machines having a new network address, or other network registration. In 418, package manager 110 can generated an encoded identification 172 of any newly registered and/or updated machines, for instance by receiving a configuration command from network management platform 174 or otherwise. In 420, processing can return to a prior processing point, jump to a further processing point, or end.

Figure 5:
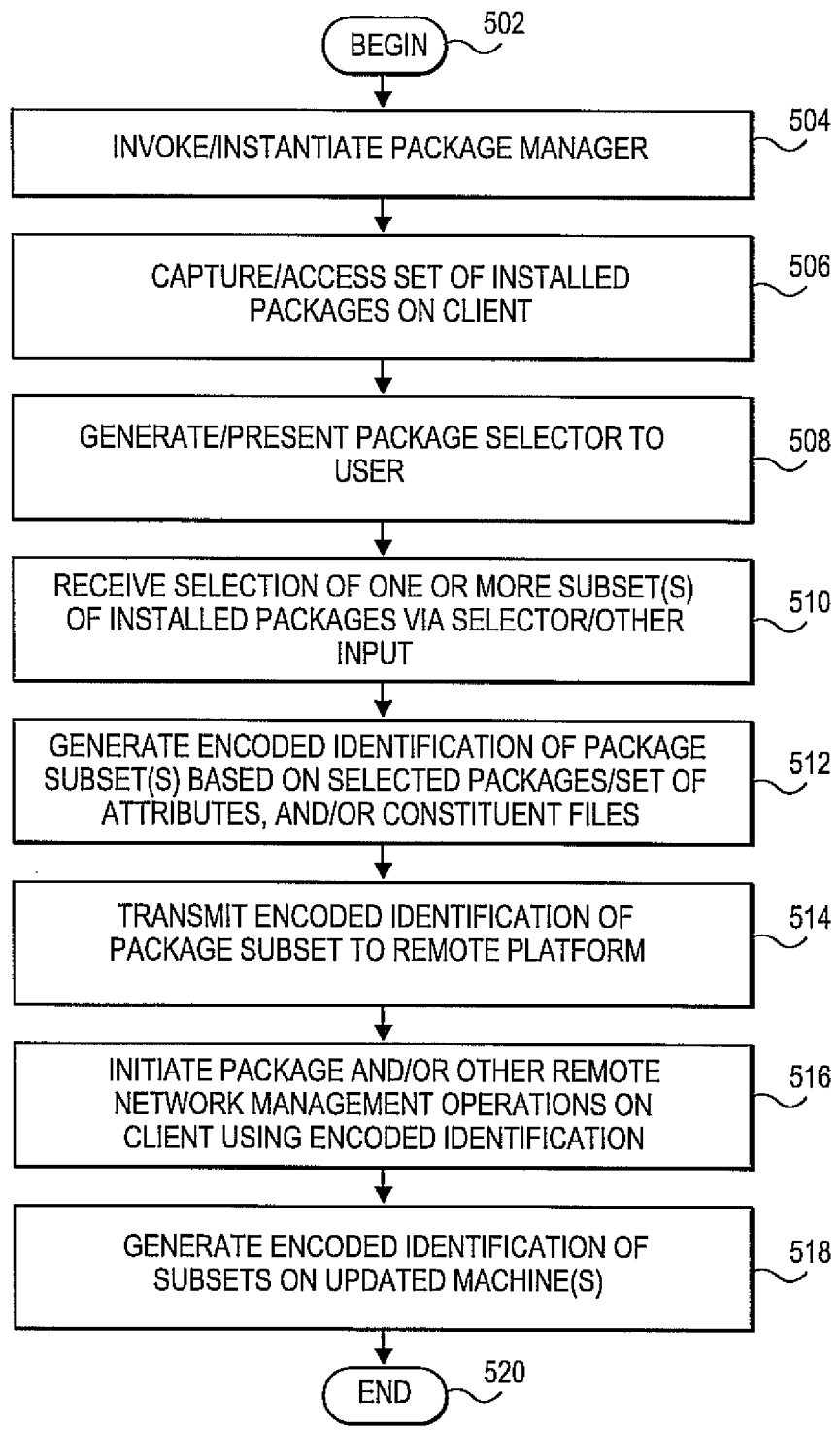
FIG. 5 illustrates a flowchart of processing that can be used in systems and methods for generating encoded identifications of selected subsets of installed software packages on a client machine, according to various embodiments.

FIG. 5 illustrates overall processing to capture software package information from machines and generate encoded identifications based on selected subsets of packages installed or hosted on those machines, according to various embodiments. In 502, processing can begin. In 504, a user can invoke or instantiate package manager 110 on client 102 to perform software package discovery, machine identification, and other management activity. In 506, a set of installed packages 112 can be captured and/or accessed, for instance via package manager 110 and/or other logic. In 508, a selector 182 can be generated, invoked, and/or presented to a user of client 102 to provide a set of selections of software packages, for instance using a directory, list, graphical interface, or other interface. In 510, package manager 110 and/or other logic can receive a selection of one or more package subset 180 or set of installed packages 112 via selector 180, and/or other input. For example, in aspects one or more packages in package subset 180, or portions thereof, can be automatically selected by package manager 110 and/or other logic, for example, to extract those packages more than a year old, or based on other criteria or conditions.

In 512, package manager 410 and/or other logic can generate an encoded identification 172 based on set of attributes 114 for one or more package subset 180, and/or constituent files of those packages. In aspects, encoded identification 172 representing that package subset or subsets can be generated using a hash function operating on text, strings, or other data reflecting one or more attributes in set of attributes 114 for subject packages. In cases where a hash function or hash operator is used, the hash function can be or include SHA1 (Secure Hash Algorithm 1), SHA2 (Secure Hash Algorithm 2), SHA3 (Secure Hash Algorithm 3), and/or other hash functions, operators or routines. In aspects, encoded identification 172 representing one or more package subset 180 need not be based on a hash function, but can in addition or instead be based on other classes of functions or algorithms.

In 514, package manager 110 and/or other logic can transmit encoded identification 172 representing one or more package subset 180 to a remote platform, such as a package server 170, a network management platform 174, and/or other remote server, platform, or service. In 516, package operations and/or other remote network management operations or functions can be initiated on client 102 using encoded identification 172 of one or more package subset 180. For instance, in aspects, package server 170 can identify client 102 using encoded identification 172 and generate a package update to update one or more package subset 180 and/or the entire set of installed packages 112 on client 102. For further instance, in aspects, a network management platform 174 can establish a secure channel, or otherwise communicate, with client 102 to perform network management functions, such as, for example, performing configuration management on one or more client 102, executing security services related to one or more client 102, and/or other management operations. In 518, a managed network 176 containing one or more client 102 can be interrogated, for instance via network management platform 174, to discover any newly connected, activated, and/or updated machines. For instance, network management platform 174 can be configured to discover physical and/or virtual machines having a new network address, or other network registration. In 520, package manager 110 can generate an encoded identification 172 of one or more package subset 180 of any newly registered and/or updated machines, for instance by receiving a configuration command from network management platform 174 or otherwise. In 522, processing can return to a prior processing point, jump to a further processing point, or end.

It may be noted that in embodiments, package manager 110 and/or other logic can be configured to generate an encoded identification 172 for selected machines in managed network 176 based on their complete package complement hosted in set of installed packages 112, while generating an encoded identification 172 for other or additional machines based on one or more package subset 180. It may likewise be noted that in aspects, any one client 102 or other machine in managed network 176 or otherwise can be subjected to package analysis and encoding more than one time and/or on more than one basis, so that, for instance, a given client 102 can have more than one associated encoded identification 172, for instance an encoded identification 172 representing a complete set of installed packages 112, as well as an encoded identification 172 for one or more package subset 180 present on that machine. Other encoding inputs, configurations, and outputs are possible.

The foregoing description is illustrative, and variations in configuration and implementation may occur to persons skilled in the art. For example, while embodiments have been described in which a unitary package manager 110 operating on client 102 is configured to control package management and client identification activity, in embodiments, multiple local and/or remote applications or software can interact to control the downloading, installation, testing, and other management of software packages, and the generation of encoded identification 172. For further example, while embodiments have been described in which one encoded identification 172 can be generated for one client 102, in embodiments, more than one encoded identification 172 can be generated for a given client 102, for instance, by appending additional data to encoded identification 172, and/or operating on data stored on or associated with client 102 in addition to set of installed packages 112 and associated set of package attributes 114. For yet further example, while embodiments have been described in which package update or client identification activity is conducted on one client 102, in embodiments, multiple local or remote targets, clients, and/or other machines can register to package manager 110 and/or other logic or resources to receive or perform package update and/or identification-encoding activity. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
identifying a plurality of software packages currently installed on a client machine;
generating, at the client machine, an encoded identification of a subset of the plurality of software packages, wherein the encoded identification comprises an output of a hash function applied to a set of attributes for each software package in the subset of the plurality of software packages;
communicating the encoded identification from the client machine to a remote management platform; and
receiving, at the client machine, a software package update for at least one of the subset of the plurality of software packages in response to a determination by the remote management platform that a plurality of encoded identifications corresponding to a plurality of client machines encode a particular attribute, wherein the plurality of client machines comprises the client machine, wherein the plurality of encoded identifications comprises the encoded identification generated by the client machine, and wherein the set of attributes comprises the particular attribute encoded by the generated encoded identification.

2. The method of claim 1, wherein the set of attributes comprises at least one of a name of the software package, a version of the software package, an epoch of the software package, a timestamp of the software package, a size of the software package, a name of a file in the software package, a version of the file, a timestamp of the file, or a size of the file.

3. The method of claim 1, wherein the hash function comprises a hash function based on a value of a text string associated with the set of attributes.

4. The method of claim 1, wherein the remote management platform comprises a package management platform, and wherein the client machine and the subset of the plurality of software packages are identified to the package management platform via the encoded identification of the subset of the plurality of software packages.

5. The method of claim 4, wherein the package management platform generates the software package update for the client machine using the encoded identification of the subset of the plurality of software packages.

6. The method of claim 1, wherein the remote management platform comprises a network management platform that initiates network management operations on the client machine using the encoded identification of the subset of the plurality of software packages.

7. The method of claim 1, further comprising receiving a selection of the subset by at least one of a user input or an automatic selection.

8. The method of claim 1, further comprising generating an update to the encoded identification of the subset of the set of the plurality of software packages based on a detected change in the plurality of software packages installed on the client machine.

9. A system comprising:
a data store, at a client machine, to store a plurality of software packages installed on the client machine; and
a processor, at the client machine, to communicate with the data store to:
identify the plurality of software packages currently installed on the client machine,
generate an encoded identification of a subset of the plurality of software packages, wherein the encoded identification comprises an output of a hash function applied to a set of attributes for each software package in the subset of the plurality of software packages,
communicate the encoded identification from the client machine to a remote management platform, and
receive a software package update for at least one of the subset of the plurality of software packages in response to a determination by the remote management platform that a plurality of encoded identifications corresponding to a plurality of client machines encode a particular attribute, wherein the plurality of client machines comprises the client machine, wherein the plurality of encoded identifications comprises the encoded identification generated by the client machine, and wherein the set of attributes comprises the particular attribute encoded in the generated encoded identification.

10. The system of claim 9, wherein the set of attributes comprises at least one of a name of the software package, a version of the software package, an epoch of the software package, a timestamp of the software package, a size of the software package, a name of a file in the software package, a version of the file, a timestamp of the file, or a size of the file.

11. The system of claim 9, wherein the hash function comprises a hash function based on a value of a text string associated with the set of attributes.

12. The system of claim 9, wherein the remote management platform comprises a package management platform, and wherein the client machine and the subset of the plurality of software packages are identified to the package management platform via the encoded identification of the subset of the plurality of software packages.

13. The system of claim 12, wherein the package management platform generates the software package update for the client machine using the encoded identification of the subset of the plurality of software packages.

14. The system of claim 9, wherein the remote management platform comprises a network management platform that initiates network management operations on the client machine using the encoded identification of the subset of the plurality of software packages.

15. The system of claim 9, wherein the processor is further to receive a selection of the subset by at least one of a user input or an automatic selection.

16. The system of claim 9, wherein the processor is further to generate an update to the encoded identification of the subset of the plurality of software packages based on a detected change in the plurality of software packages installed on the client machine.

* * * * *